No. 736,250. Patented August 11, 1903.

UNITED STATES PATENT OFFICE.

FRIEDRICH HANSSEN, OF ALTONA-ON-THE-ELBE, GERMANY.

PROCESS OF MAKING HEMOGLOBIN PREPARATIONS.

SPECIFICATION forming part of Letters Patent No. 736,250, dated August 11, 1903.

Application filed September 3, 1902. Serial No. 122,001. (No specimens.)

*To all whom it may concern:*

Be it known that I, FRIEDRICH HANSSEN, a subject of the Emperor of Germany, residing at Altona-on-the-Elbe, in the Empire of Germany, have invented certain new and useful Improvements in Processes of Producing Medicinal Preparations of Hemoglobin, of which the following is a specification.

The hemoglobin of the blood and blood free from fibrin have already been utilized for producing blood-forming liquid preparations. As the blood and the hemoglobin easily become decomposed and, moreover, have a decidedly unpleasant taste, attempts have been made to preserve the liquid preparations made therefrom by adding thereto a somewhat considerable quantity of glycerin and to remove the taste of blood by the addition of wine, especially Malaga wine. Glycerin, however, is not a neutral substance. It is indigestible and irritates the mucous membrane. For this reason alone it is not suitable for a liquid medical preparation given to patients in large doses. The wine added, moreover, only incompletely removes the taste of blood and in consequence of its acid reaction increases the taste of iron in the hemoglobin. Apart from this the sugar contained in the wine easily causes decomposition of the hemoglobin.

By means of the present process a much more perfect hemoglobin preparation is obtained in both respects by reason of the hemoglobin being converted into carbonated hemoglobin by the introduction of carbonic acid. I have found that hemoglobin can be more easily preserved from decomposition when combined with carbonic acid and that the taste of blood belonging thereto is considerably lessened and can be entirely removed by the suitable addition of aromatic substances.

The process consists generally in mixing hemoglobin of any kind with carbonic acid. In such case the carbonic acid combines with the hemoglobin, and the solution is mixed, for instance, with a spirituous extract of spice, brandy, or the like.

In this process the hemoglobin or the hemoglobin solution may be mixed with any preferred liquids or other substances, either before or after being combined with the carbonic acid. The only important point is that the hemoglobin and the carbonic acid shall come into contact and be enabled to combine together. Blood free of fibrin may also be mixed with carbonic acid and be employed for producing blood preparations containing the new carbonated hemoglobin. Further, the serum may be partially eliminated from the blood or the hemoglobin more or less completely separated from the serum and the hemoglobin thus obtained be dissolved in water or a liquid containing water and then be mixed with the carbonic acid.

It is not possible to enumerate all the different ways of carrying out the process. It may, however, be especially observed that the preparation can be mixed with milk. It is, in fact, very advisable to administer the preparation mixed with milk. This mixture with milk is of a color resembling chocolate. If suitable spices be used, especially vanilla in the form of a spirituous extract, a beverage is obtained which has exactly the color and taste of chocolate. It is obvious that this is an important advantage in medicinal preparations compared with the blood preparations hitherto known, as the value of a medicinal preparation depends not only upon its effect, but also largely upon the particular flavor which facilitates its being taken.

In this process diluted as well as concentrated solutions of hemoglobin may be employed.

The process may also be carried out so that the excess carbonic acid is allowed to evaporate or any excess of carbonic acid may be allowed to remain in the preparation.

The combination of the carbonic acid with the hemoglobin may be effected by adding carbonates or bicarbonates to the mixture and then setting the carbonic acid free by adding a suitable acid, such as tartaric, citric, or other edible acid. In connection herewith a certain portion of the carbonate may in certain cases be left undecomposed.

Having now particularly described and ascertained the nature of my said invention and in what manner the same is to be performed, I declare that what I claim is—

The process herein described for producing medicinal preparations of hemoglobin which consists in mixing solutions of hemoglobin with carbonates and then adding an acid which will set free the carbonic acid, substantially as set forth.

In witness whereof I have hereunto set my hand in presence of two witnesses.

FRIEDRICH HANSSEN.

Witnesses:
E. H. L. MUMMENHOFF,
OTTO W. HELLMRICH.